US010780639B2

(12) United States Patent
Schödel et al.

(10) Patent No.: US 10,780,639 B2
(45) Date of Patent: Sep. 22, 2020

(54) IRRADIATION DEVICE FOR AN APPARATUS FOR ADDITIVELY MANUFACTURING THREE-DIMENSIONAL OBJECTS

(71) Applicant: CONCEPT LASER GMBH, Lichtenfels (DE)

(72) Inventors: Frank Schödel, Kronach (DE); Peter Pontiller-Schymura, Neudrossenfeld (DE); Boris Eichenberg, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 106 days.

(21) Appl. No.: 16/132,282

(22) Filed: Sep. 14, 2018

(65) Prior Publication Data

US 2019/0111623 A1    Apr. 18, 2019

(30) Foreign Application Priority Data

Oct. 18, 2017 (EP) .................................. 17197134

(51) Int. Cl.
*B29C 64/268* (2017.01)
*B33Y 30/00* (2015.01)
(Continued)

(52) U.S. Cl.
CPC .......... *B29C 64/268* (2017.08); *B22F 3/1055* (2013.01); *B23K 26/342* (2015.10);
(Continued)

(58) Field of Classification Search
CPC ...... B29C 64/268; B33Y 30/00; B23K 26/342
See application file for complete search history.

(56) References Cited

U.S. PATENT DOCUMENTS 6,717,106 B2    4/2004  Nagano et al.
10,399,183 B2   9/2019  Dallarosa et al.
(Continued)

FOREIGN PATENT DOCUMENTS

JP    2000028914 A    1/2000
JP    2003/080604     3/2003
WO   WO2016/201326   12/2016

OTHER PUBLICATIONS

European Search Opinion Corresponding to Application No. 17197134.4.
(Continued)

*Primary Examiner* — Jacob T Minskey
*Assistant Examiner* — Melody Tsui
(74) *Attorney, Agent, or Firm* — Dority & Manning, P.A.

(57) ABSTRACT

Irradiation device (6) for an apparatus (1) for additively manufacturing three-dimensional objects (2) by successive layerwise selective irradiation and consolidation of layers of a build material (3) which can be consolidated by means of an energy beam (4), the irradiation device (6) being adapted for a successive layerwise selective irradiation and consolidation of layers of a build material (3) by means of at least one energy beam (4), the irradiation device (6) comprising: —a plurality of beam generating units (7a-7c) each being adapted to generate at least one energy beam (4a-4c) of given beam properties, each beam generating unit (7a-7c) being couplable or coupled a with at least one beam guiding element (8a-8c), —a plurality of beam guiding elements (8a-8c), in particular beam guiding fibers, each beam guiding element being (8a-8c) couplable or coupled with at least one beam generating unit.

20 Claims, 6 Drawing Sheets

(51) Int. Cl.
    *B29C 64/209*     (2017.01)
    *B28B 1/00*     (2006.01)
    *B22F 3/105*     (2006.01)
    *B23K 26/342*     (2014.01)
    *B29C 64/153*     (2017.01)
    *B29C 64/277*     (2017.01)

(52) U.S. Cl.
    CPC ............ *B28B 1/001* (2013.01); *B29C 64/153* (2017.08); *B29C 64/209* (2017.08); *B29C 64/277* (2017.08); *B33Y 30/00* (2014.12); *B22F 2003/1056* (2013.01)

(56) References Cited

U.S. PATENT DOCUMENTS

2002/0164069 A1    11/2002    Nagano et al.
2003/0052105 A1*    3/2003    Nagano ................ B29C 64/277
                                                                 219/121.83
2003/0214571 A1    11/2003    Ishikawa et al.

OTHER PUBLICATIONS

European Search Report Corresponding to Application No. 17197134 dated Apr. 9, 2018.
Japanese Office Action Corresponding to Application No. 2018110902 dated Jun. 18, 2019.

* cited by examiner

IRRADIATION DEVICE FOR AN APPARATUS FOR ADDITIVELY MANUFACTURING THREE-DIMENSIONAL OBJECTS

CROSS-REFERENCE TO RELATED APPLICATIONS

This application claims priority to European Patent Application serial no. 17 197 134.4 filed Oct. 18, 2017, the contents of which is incorporated herein by reference in its entirety as if set forth verbatim.

The invention relates to an irradiation device for an apparatus for additively manufacturing three-dimensional objects by means of successive layerwise selective irradiation and consolidation of layers of a build material which can be consolidated by means of an energy beam, the irradiation device being adapted for selectively irradiating and consolidating of layers of a build material by means of at least one energy beam.

A respective irradiation device being adapted for selectively irradiating and consolidating of layers of a build material by means of at least one energy beam is an essential functional component of an apparatus for additively manufacturing three-dimensional objects by means of successive layerwise selective irradiation and consolidation of layers of a build material which can be consolidated by means of an energy beam. Thus, a respective irradiation device is generally known in the field of additive manufacturing.

By now, respective irradiation devices comprise beam deflection units, e.g. in the shape of scanning units, which are adapted to deflect an energy beam onto defined positions of a build plane, i.e. the plane in which the successive selective irradiation and consolidation of layers of a build material which can be consolidated by means of an energy beam takes place during an additive manufacturing process. Respective beam deflection units may be exactly positioned relative to the build plane in order to assure a certain irradiation and therefore, consolidation result.

In view of the steady increase of the dimensions of respective build planes and the functionality of respective irradiation devices, e.g. in terms of implementing different irradiation approaches or irradiation strategies, there is an existing need of developing improved irradiation devices.

It is the object of the present invention to provide an improved irradiation device for an apparatus for additively manufacturing of three-dimensional objects.

The object is achieved by an irradiation device according to independent claim 1. The Claims depending on claim 1 relate to possible embodiments of the irradiation device according to claim 1.

The irradiation device described herein is typically assigned to an apparatus ("additive manufacturing apparatus") for additively manufacturing three-dimensional objects by means of successive layerwise selective irradiation and consolidation of layers of a build material which can be consolidated by means of an energy beam. As such, the irradiation device is adapted for selectively irradiating and consolidating of layers of a build material in context with the operation of an additive manufacturing apparatus in which three-dimensional objects are additively manufactured by means of successive layerwise selective irradiation and consolidation of layers of a build material which can be consolidated by means of an energy beam.

The irradiation device comprises a plurality of beam generating units. The number of beam generating units may be arbitrarily chosen. Each beam generating unit is adapted to generate at least one energy beam of given beam properties. An energy beam may be a laser beam, for instance; thus, a beam generating unit may be adapted to generate at least one laser beam. The beam generating units represent the component of the irradiation device serving for generating at least one energy beam used for successive layerwise selective irradiation and consolidation of layers of a build material during operation of the irradiation device or an additive manufacturing apparatus the irradiation device is assigned to.

Each beam generating unit is couplable or coupled a with at least one beam guiding element; thus, each beam generating unit comprises a suitable coupling interface for coupling with a beam guiding element or a (first) coupling interface of a beam guiding element, respectively.

As will be apparent from the below description of possible embodiments of the irradiation device, the irradiation device may comprise a number of beam generating units having the same technical specifications so that the beam generating units are adapted to generate energy beams of (essentially) identical beam properties or the irradiation device may comprise a number of beam generating units having different technical specifications, e.g. operational parameters, so that the beam generating units are adapted to generate energy beams of different beam properties. As such, a first beam generating unit may be adapted to generate at least one energy beam of given beam properties different from the given beam properties of at least one energy beam generated by at least one further beam generating unit. As mentioned before, this may result from different operational parameters of different beam generating units; e.g. a first beam generating unit may be operated at a first power level, a second beam generating unit may be operated at a second power level different form the first power level, for instance. In other words, beam generating units may be adapted to generate energy beams of different beam properties.

At least one beam generating unit may be built as or may comprise a laser diode unit. Hence, the beam generating units do not necessarily have to be implemented as "conventional" fiber lasers with associated beam deflecting unit, but may be implemented as diode lasers or laser diode, respectively. It is particularly possible that at least two different laser diodes are used so that each laser diode may generate an energy beam of specific beam properties.

The irradiation device further comprises a plurality of beam guiding elements, e.g. beam guiding fibers or (optical) waveguide fibers, respectively. The beam guiding elements represent the component of the irradiation device serving for guiding respective energy beams generated by the beam generating units to an irradiation head of the irradiation device. As such, each beam guiding element is couplable or coupled with at least one beam generating unit and couplable or coupled with an irradiation head of the irradiation device. Each beam guiding element may be couplable or coupled with at least one beam generating unit via a first coupling interface and couplable or coupled with the irradiation head via a second coupling interface. Each beam guiding element may thus, comprise a first coupling interface adapted to couple the beam guiding element with a beam generating unit and a second coupling interface adapted to couple the beam guiding element with an irradiation head. Both a respective first and a respective second coupling interface may be built as or comprise an optical coupling element, e.g. a coaxial connector such as a SMA connector. Coupling of the beam guiding element with the beam generating unit(s) and the irradiation head may be implemented as a detachable or non-detachable coupling.

The irradiation device further comprises at least one irradiation head. The irradiation head is couplable or coupled with the plurality of beam guiding elements; thus, the irradiation head comprises suitable coupling interfaces for coupling with the beam guiding elements or (second) coupling interfaces of the beam guiding elements, respectively. Hence, energy beams generated by the beam guiding units and guided to the irradiation head by the beam guiding elements can be input into the irradiation head. The energy beams input into the irradiation head may at least partly be combined in the irradiation head to form a resulting energy beam which is output from the irradiation head towards the build plane, i.e. the plane in which the successive selective irradiation and consolidation of layers of a build material which can be consolidated by means of an energy beam takes place during an additive manufacturing process, and which thus, may be used for irradiating the build material.

The irradiation head comprises at least one beam modifying unit. As will be apparent from below, the beam modifying unit may also be denoted as a beam imaging unit. The beam modifying unit is adapted to individually modify the beam properties of each of the energy beams coupled into the irradiation head by a respective beam guiding element and thus, to individually modify the beam properties of a resulting energy beam output by the irradiation head. The beam modifying unit may therefore, individually modify the beam properties—e.g. spot dimensions, spot focus position, (lateral) spot position of each of the energy beams coupled in the irradiation head—of the energy beams which are used for irradiating and consolidating layers of build material during operation of the irradiation device or an additive manufacturing apparatus the irradiation device is assigned to, respectively. Thus, the energy output of the irradiation head, which may be a resulting energy beam as mentioned above, used for irradiating and consolidating layers of build material may be arbitrarily controlled so that different irradiation approaches or irradiation strategies, respectively can be implemented.

Each energy beam which is input into the irradiation head and the beam modifying unit, respectively typically traverses through the beam modifying unit in its own beam path or optical path, respectively. Hence, the beam modifying unit may comprise a number of separate, typically parallel, beam or optical paths, whereby the number of beam paths may correspond to the number of energy beams input into the irradiation head and the beam modifying unit, respectively.

The irradiation head typically, comprises a housing or housing structure, respectively. The housing may be a structural unit which may be separately handled. The housing comprises a(n internal) housing space adapted to house the aforementioned sub-components of the irradiation head, i.e. particularly the coupling interface and the beam modifying unit.

The beam modifying unit may be particularly adapted to individually modify the spot dimensions, in particular spot shape, spot size, etc., and/or the spot focus position relative to the build plane and/or the (lateral) spot position relative to a reference axis, of each of the energy beams coupled into the irradiation head by a respective beam guiding element. A respective reference axis may be an optical axis of an optical arrangement of the beam modifying unit. By modifying spot dimensions and/or spot focus positions and/or (lateral) spot positions relative to a reference axis, the energy input into the build plane may be individually controlled and thus, arbitrary irradiation strategies may be implemented. As an example, by modifying the spot dimensions and/or the spot focus positions and/or the (lateral) spot positions relative to a reference axis, at least one overlap of a plurality of energy beams may be implemented, whereby the degree of overlap may be controlled by the beam modifying unit. Since the energy input into the build plane may be individually controlled, also a controlled tempering, e.g. by the implementation of controlled heating of (non-melted) build material and/or cooling of (melted) build material, of the build plane or at least one sub-area of the build plane may be implemented.

The beam modifying unit may comprise an optical arrangement. The optical arrangement may be adapted to modify the beam properties of the energy beams traversing through the optical arrangement. The optical arrangement may comprise a number of, in particular a plurality of, optical elements arranged relative to an optical axis of the optical arrangement. Respective optical elements may be arranged at different axial positions relative to the optical axis of the optical arrangement; thus, respective optical elements may be coaxially arranged relative to the optical axis of the optical arrangement, i.e. particularly in the optical axis or parallel to the optical axis of the optical arrangement. Each optical element may be built as or may comprise a transmissive optical lens. A respective optical lens may be a (bi)convex lens, i.e. a converging lens, or a (bi)concave lens, i.e. a diverging lens.

As mentioned above, each energy beam input into the irradiation head and the beam modifying unit, respectively typically traverses through the optical arrangement in its own beam path or optical path, respectively. Hence, the optical arrangement may comprise a number of separate, typically parallel, beam or optical paths, whereby the number of beam paths may correspond to the number of energy beams input into the irradiation head and the beam modifying unit, respectively.

The optical arrangement may be configured in different ways. As such, the optical arrangement may not be adapted to generate an intermediate focus or may be adapted to generate an intermediate focus.

In a first exemplary configuration, the optical arrangement is not adapted to generate an intermediate focus. In this configuration, the optical arrangement may comprise a plurality of optical elements, in particular coaxially, arranged relative to the optical axis of the optical arrangement. Thereby, a first optical element may be built as or comprise a (bi)convex lens, a second optical element (directly) disposed after the first optical element with respect to the extension of the energy beams through the optical arrangement or the optical path of the energy beams through the optical arrangement may be built as or may comprise a (bi)concave lens, a third optical element (directly) disposed after the second optical element with respect to the extension of the energy beams through the optical arrangement or the optical path of the energy beams through the optical arrangement may be built as or may comprise a (bi)convex lens, and a fourth optical element (directly) disposed after the third optical element with respect to the extension of the energy beams through the optical arrangement or the optical path of the energy beams through the optical arrangement may be built as or may comprise a (bi)convex lens. The aforementioned arrangement is of exemplary nature, i.e. the optical arrangement may also comprise other arrangements of optical elements having the same or similar optical properties.

This specific arrangement of optical elements allows for imaging the energy beams in the build plane and thus, for generating an image of the energy beams in the build plane. As long as the spatial extension of the arrangement of the beam guiding elements, which may be arranged in an array comprising a number of columns and/or rows, is small compared with the numerical aperture of the optical arrangement, the beam guiding elements, i.e. particularly the ends of the beam guiding elements facing the build plane, may be imaged onto the build plane. The spot dimensions, particularly the spot diameter, of a resulting energy beam irradiating the build plane may be modified by adjusting the diameter of the raw beam in the fourth optical element. The spot dimensions, particularly the spot diameter, of a resulting energy beam as well as an overlap of energy beams may also by modified by relative motions of the irradiation head and/or the build plane outside the focal plane of the optical arrangement. Hence, by modifying the diameter of the raw beam in the fourth optical element and the position of the build plane relative to the focal plane of the optical arrangement, different spot dimensions and degrees of overlap can be achieved.

In a second exemplary configuration, the optical arrangement is adapted to generate an intermediate focus. Also in this configuration, the optical arrangement may comprise a plurality of optical elements, in particular coaxially, arranged relative to the optical axis of the optical arrangement. Thereby, a first optical element may be built as or may comprise a (bi)convex lens, a second optical element (directly) disposed after the first optical element with respect to the extension of the energy beams through the optical arrangement or the optical path of the energy beams through the optical arrangement may be built as or may comprise an aperture element, e.g. a bezel element, adapted to generate an intermediate image of the energy beams at a specific image distance relative to the first optical element, a third optical element (directly) disposed after the second optical element with respect to the extension of the energy beams through the optical arrangement or the optical path of the energy beams through the optical arrangement may be built as or may comprise a (bi)convex lens, and a fourth optical element (directly) disposed after the third optical element with respect to the extension of the energy beams through the optical arrangement or the optical path of the energy beams through the optical arrangement may be built as or may comprise a (bi)convex lens. The aforementioned arrangement is of exemplary nature, i.e. the optical arrangement may also comprise other arrangements of optical elements having the same or similar optical properties.

This specific arrangement of optical elements allows for imaging the energy beams in a virtual intermediate image. Thereby, the outputs of the beam guiding elements may be changed in size, i.e. increased or decreased in size, by modifying the image distance and/or the size of the opening of the aperture element. The virtual intermediate image may be used in the same manner as the image generated in the first configuration; thus, the respective annotations apply in analogous manner so that by modifying the diameter of the raw beam in the fourth optical element and the position of the build plane relative to the focal plane of the optical arrangement, different spot dimensions and degrees of overlap can be achieved.

At least one optical element of the optical arrangement may be movably supported relative to at least one further optical element. Moving optical elements relative to each other and thereby, concertedly changing distances between the optical elements, may increase the possibilities for modifying the beam properties of the energy beams coupled into the irradiation head by a respective beam guiding element and the beam properties of a resulting energy beam, respectively. The moveable support of the at least one movably supported optical element may be implemented by means of a drive unit, particularly a linear drive unit, adapted to generate a drive force moving the at least one movably supported optical element along a, particularly linear, axis of motion. The axis of motion may coincide with the optical axis of the optical arrangement.

A drive unit may be built as or may comprise a motor, in particular an electric motor, adapted to generate a respective drive force.

It was mentioned before that the beam guiding elements may be arranged in an array. Hence, the beam guiding elements may be coupled to the irradiation head in an array-arrangement in which the beam guiding elements are arranged or grouped in a special spatial relationship relative to each other. The array arrangement may comprise an arrangement of beam guiding elements, i.e. particularly the ends of the respective beam guiding elements, in at least one row and/or at least one column. Thus, a respective array arrangement may comprise at least one row in which a plurality of beam guiding elements, i.e. particularly the ends of the respective beam guiding elements, are arranged, and/or at least one column, in which a plurality of beam guiding elements, i.e. particularly the ends of the respective beam guiding elements, are arranged. Thus, the beam guiding elements, i.e. particularly the ends of the respective beam guiding elements, may be arranged in different radial positions relative to the optical axis of the optical arrangement.

The invention also relates to an irradiation head for an irradiation device as specified above. The irradiation head is couplable with a plurality of beam guiding elements. The irradiation head comprises at least one beam modifying unit, the beam modifying unit being adapted to individually modify the beam properties, e.g. spot dimensions (shape, size, etc.), spot focus position, (lateral) spot position relative to a reference axis, etc., of each of the energy beams coupled into the irradiation head by a respective beam guiding element. All annotations concerning the irradiation device apply to the irradiation head in analogous manner.

The invention further relates to an apparatus ("additive manufacturing apparatus") for additively manufacturing of three-dimensional objects, e.g. technical components, by means of successive layerwise selective irradiation and consolidation of layers of a build material—the build material may comprise at least one of a metal powder, a ceramic powder, or a polymer powder, for instance—which can be consolidated by means of an energy beam. The apparatus comprises at least one irradiation device as specified above. A respective apparatus can be a metal binder jetting apparatus, a selective laser sintering apparatus, a selective laser melting apparatus, or a selective electron beam melting apparatus, for instance. All annotations concerning the irradiation device apply to the additive manufacturing apparatus in analogous manner.

The additive manufacturing apparatus comprises a number of functional devices which are operable during its operation. Each functional device may comprise a number of functional units. Exemplary functional devices are a build material application device, e.g. a recoating device, configured to apply a layer of build material which is to be selectively irradiated and consolidated, e.g. in the build plane of a process chamber of the apparatus, and an irradiation device configured to selectively irradiate and consolidate portions of a layer of build material with at least one energy beam. As mentioned before, the or at least one irradiation device is the one as specified above.

The irradiation head may be movably supported relative to a build plane of the additive manufacturing apparatus. The moveable support may include transactional and/or rotational motions of the irradiation head in at least one degree of freedom of motion. In particular, the irradiation head, may be movably supported in at least three different axes/dimensions of motion relative to the build plane of the apparatus. In this case, the additively manufacturing may comprise a fixed build plane, whereby the irradiation head is movably supported relative to the build plane particularly in vertical direction (z-direction). The moveable support of the irradiation head may be implemented by means of at least one drive unit adapted to generate a drive force moving the irradiation head in at least one freedom degree of motion, i.e. particularly along at least one axis of motion. The axis of motion may coincide with a horizontal axis (x- and/or y-axis) or with a vertical axis (z-axis). A drive unit may be built as or may comprise a motor, in particular an electric motor, adapted to generate a respective drive force.

The additive manufacturing apparatus may comprise a, particularly modular, build unit, the build unit may comprise a build material application device adapted to apply build material in the build plane of the apparatus, and at least one irradiation device as specified above. The build unit may be movably supported in at least three different axes of motion/dimensions relative to the build plane of the additive manufacturing apparatus.

Exemplary embodiments of the invention are described with reference to the FIG., whereby.

Figure 1:
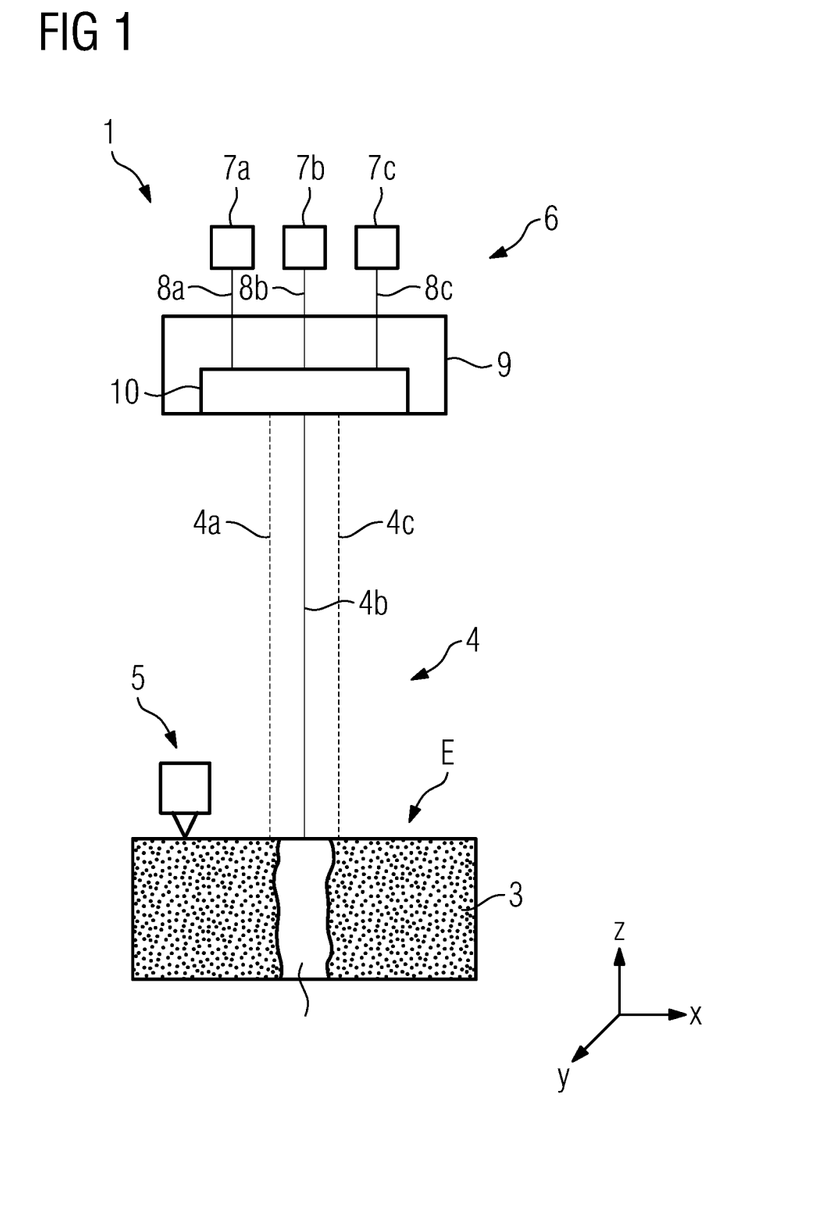
FIG. 1 shows a principle drawing of an apparatus for additively manufacturing three-dimensional objects according to an exemplary embodiment.

FIG. 1 shows a principle drawing of an apparatus 1 for additively manufacturing three-dimensional objects 2, e.g. technical components, by means of successive layerwise selective irradiation and accompanying consolidation of layers of a powdered build material 3, e.g. a metal powder, which can be consolidated by means of at least one energy beam 4 according to an exemplary embodiment. The apparatus 1 can be a selective laser melting apparatus, for instance.

The apparatus 1 comprises a number of functional devices which are operable during its operation. Each functional device may comprise a number of functional units. Operation of the functional devices and the apparatus, respective is controlled by a control device (not depicted).

Exemplary functional devices of the apparatus 1 are a build material application device 5, e.g. a coating device, and an irradiation device 6. The build material application device 5 is configured to apply layers of build material 3 in the build plane E of the apparatus 1, the layers being selectively irradiated and consolidated during the additive build-up of the object 2. The irradiation device 6 is configured to selectively irradiate and consolidate portions of layers of build material 3 with at least one energy beam 4 during the additive build-up of the object 2.

The irradiation device 6 comprises a plurality of beam generating units 7a-7c. Each beam generating unit 7a-7c is adapted to generate at least one energy beam 4a-4c of given beam properties. Since the energy beam is a laser beam in the exemplary embodiments given in the FIG., each beam generating unit 7a-7c is adapted to generate at least one laser beam. Each beam generating unit 7a-7c may be a laser diode. It is possible that at least two different laser diodes are used so that each laser diode may generate an energy beam 4a-4c of specific beam properties.

Each beam generating unit 7a-7c is coupled a with a beam guiding element 8a-8c; thus, each beam generating unit 7a-7c comprises a suitable coupling interface (not depicted) for coupling with a beam guiding element 8a-8c or a (first) coupling interface (not depicted) of a beam guiding element 8a-8c, respectively.

Thus, the irradiation device 6 further comprises a plurality of beam guiding elements 8a-8c, e.g. beam guiding fibers or (optical) waveguide fibers, respectively having outputs 8a'-8c'. Each beam guiding elements 8a-8c is coupled with a beam generating unit 7a-7c and coupled with an irradiation head 9 of the irradiation device 6. Each beam guiding element 8a-8c may be coupled with a beam generating unit 7a-7c via a first coupling interface (not depicted) and coupled with the irradiation head 9 via a second coupling interface (not depicted). The second coupling interface is provided with the respective outputs 8a'-8c' of the beam guiding elements 8a-8c. Each beam guiding element 8a-8c may thus, comprise a first coupling interface (not depicted) adapted to couple the beam guiding element 8a-8c with a beam generating unit 7a-7c and a second coupling interface (not depicted) adapted to couple the beam guiding element 8a-8c with the irradiation head 9. Respective coupling interfaces may be built as or comprise an optical coupling element, e.g. a coaxial connector such as a SMA connector.

Thus, the irradiation device 6 further comprises an irradiation head 9. The irradiation head 9 is coupled with the beam guiding elements 8a-8c; thus, the irradiation head 9 comprises suitable coupling interfaces (not depicted) for coupling with the beam guiding elements 8a-8c or (second) coupling interfaces of the beam guiding elements 8a-8c, respectively. Hence, energy beams 4a-4c generated by the beam guiding units 7a-7c and guided to the irradiation head 9 by the beam guiding elements 8a-8c can be input into the irradiation head 9. The energy beams 4a-4c input into the irradiation head 9 may at least partly be combined in the irradiation head to form a resulting energy beam 4 which is output from the irradiation head 9 towards the build plane E and which thus, may be used for irradiating the build material 3.

The irradiation head 9 may be movably supported relative to the build plane E of the apparatus 1. The moveable support may include transactional and/or rotational motions of the irradiation head 9 in at least one degree of freedom of motion. In particular, the irradiation head 9, may be movably supported in at least three different axes/dimensions of motion relative to the build plane E of the apparatus 1. In this case, the apparatus 1 may comprise a fixed build plane E, whereby the irradiation head 9 is movably supported relative to the build plane E particularly in vertical direction (z-direction). The moveable support of the irradiation head 9 may be implemented by means of at least one drive unit (not depicted) adapted to generate a drive force moving the irradiation head 9 in at least one freedom degree of motion, i.e. particularly along at least one axis of motion. The axis of motion may coincide with a horizontal axis (x- and/or y-axis) or with a vertical axis (z-axis). A drive unit may be built as or may comprise a motor, in particular an electric motor, adapted to generate a respective drive force.

The irradiation head 9 comprises a housing 11 or housing structure, respectively. The housing 11 is a structural unit which may be separately handled. The housing 11 comprises a(n internal) housing space 12 adapted to house the sub-components of the irradiation head 9.

The irradiation head 9 comprises a beam modifying unit 10. The beam modifying unit 10 is housed in the housing 11. The beam modifying unit 10 is adapted to individually modify the beam properties of each of the energy beams 4a-4c coupled into the irradiation head 9 by a respective beam guiding element 8a-8c and thus, to individually modify the beam properties of a resulting energy beam 4 output by the irradiation head 9. The beam modifying unit 10 may therefore, individually modify the beam properties—e.g. spot dimensions, spot focus position, (lateral) spot position of each of the energy beams 4a-4c coupled in the irradiation head 9—of the energy beams 4a-4c which are used for irradiating and consolidating layers of build material 3 during operation of the irradiation device 6 and the apparatus 1, respectively. Thus, the energy output of the irradiation head 9, which may be a resulting energy 4 beam as mentioned above, used for irradiating and consolidating layers of build material 3 may be arbitrarily controlled so that different irradiation approaches or irradiation strategies, respectively can be implemented.

The beam modifying unit 10 is particularly adapted to individually modify the spot dimensions, in particular spot shape, spot size, etc., and/or the spot focus position relative to the build plane E and/or the (lateral) spot position relative to a reference axis, of each of the energy beams 4a-4c coupled into the irradiation head 9 by a respective beam guiding element 8a-8c. A respective reference axis may be an optical axis A of an optical arrangement 13 of the beam modifying unit 10 (see FIG. 3-6). By modifying spot dimensions and/or spot focus positions and/or (lateral) spot positions relative to a reference axis, the energy input into the build plane E may be individually controlled and thus, arbitrary irradiation strategies may be implemented. As an example, by modifying the spot dimensions and/or the spot focus positions and/or the (lateral) spot positions relative to a reference axis, an overlap of a plurality of energy beams 4a-4c may be implemented, whereby the degree of overlap may be controlled by the beam modifying unit 10. Since the energy input into the build plane E may be individually controlled, also a controlled tempering, e.g. by the implementation of controlled heating of (non-melted) build material 3 and/or cooling of (melted) build material 3, of the build plane E or at least one sub-area of the build plane E may be implemented.

Figure 2:
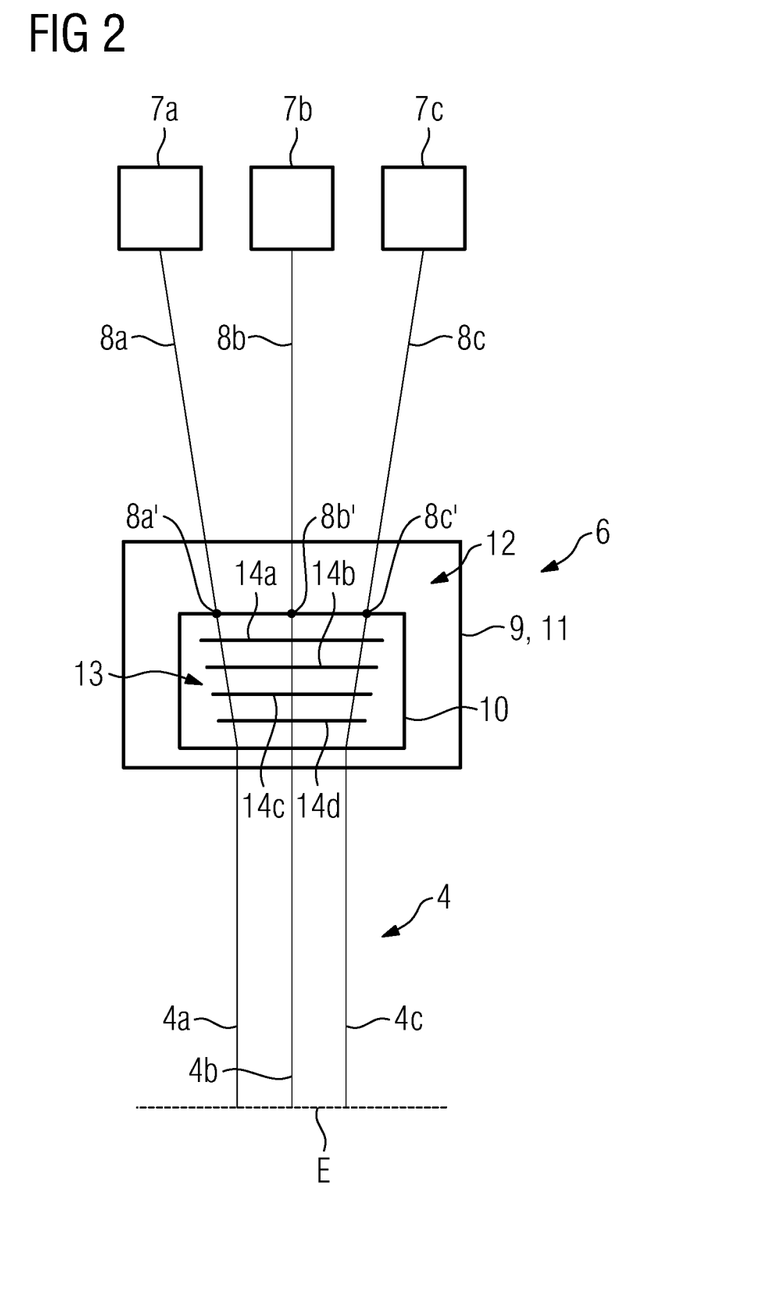
FIG. 2 shows an enlarged view of the irradiation device of FIG. 1.

FIG. 2 shows an enlarged view of the irradiation device 6 of FIG. 1. As is discernible from FIG. 2, each energy beam 4a-4c which is input into the irradiation head 9 and the beam modifying unit 10, respectively typically traverses through the beam modifying unit 10 in its own beam path or optical path, respectively. Hence, the beam modifying unit 10 comprises a number of separate, typically parallel, beam or optical paths.

The beam modifying unit 10 comprises an optical arrangement 13. The optical arrangement 13 is adapted to modify the beam properties of the energy beams 4a-4c traversing through the optical arrangement and the beam modifying unit 10, respectively. The optical arrangement 13 comprises a plurality of optical elements 14a-14d arranged relative to an optical axis A of the optical arrangement 13. Each optical element 14a-14d may be built as a transmissive optical lens, i.e. A respective optical lens may be a (bi) convex lens, i.e. a converging lens, or a (bi)concave lens, i.e. a diverging lens.

FIG. 3-6 each show a principle drawing of an optical arrangement 13 of a beam modifying unit 10 according to an exemplary embodiment.

As is discernible from FIG. 3-6, each energy beam 4a-4c input into the irradiation head 9 and the beam modifying unit 10, respectively traverses through the optical arrangement 13 in its own beam path or optical path, respectively. As is also discernible from FIG. 3-6, respective optical elements 14a-14d are coaxially arranged at different axial positions of the optical axis A of the optical arrangement 13. The distance between the input of the irradiation head 9 and the first optical element 14a is indicated by d1, the distance between the first optical element 14a and the second optical element 14b is indicated by d2, the distance between the second optical element 14b and the third optical element 14c is indicated by d3, the distance between the third optical element 14c and the fourth optical element 14d is indicated by d4. The distance between the fourth optical element 14d and the build plane E is indicated by d5.

The optical arrangement 13 may be configured in different ways; exemplary configurations are given in FIG. 3-6.

Figure 3:
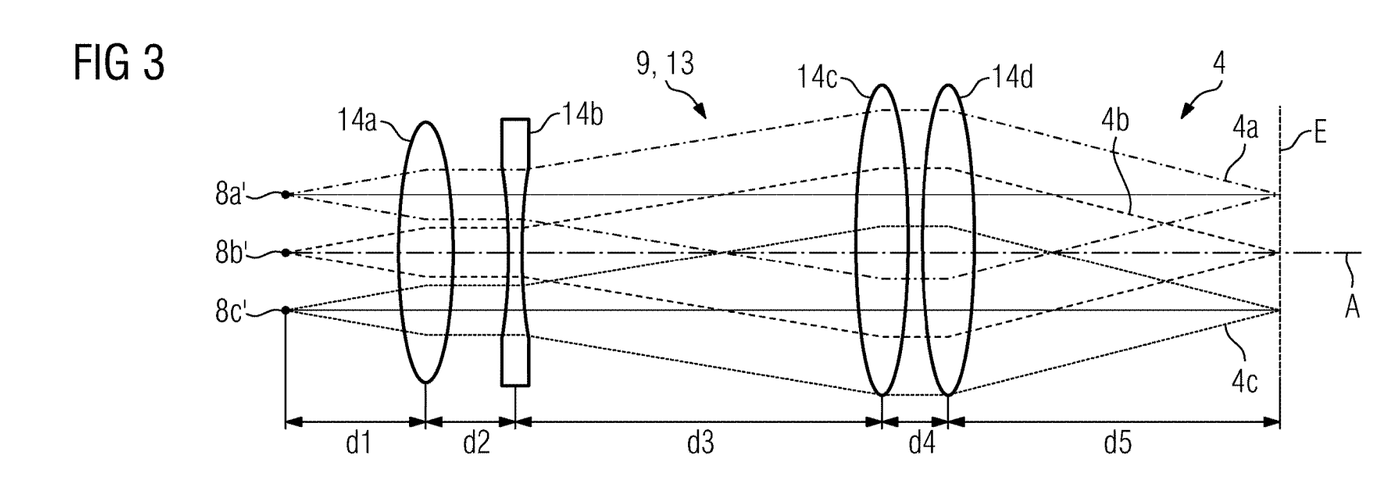
FIG. 3-6 each show a principle drawing of an optical arrangement of a beam modifying unit according to an exemplary embodiment.
Figure 4:
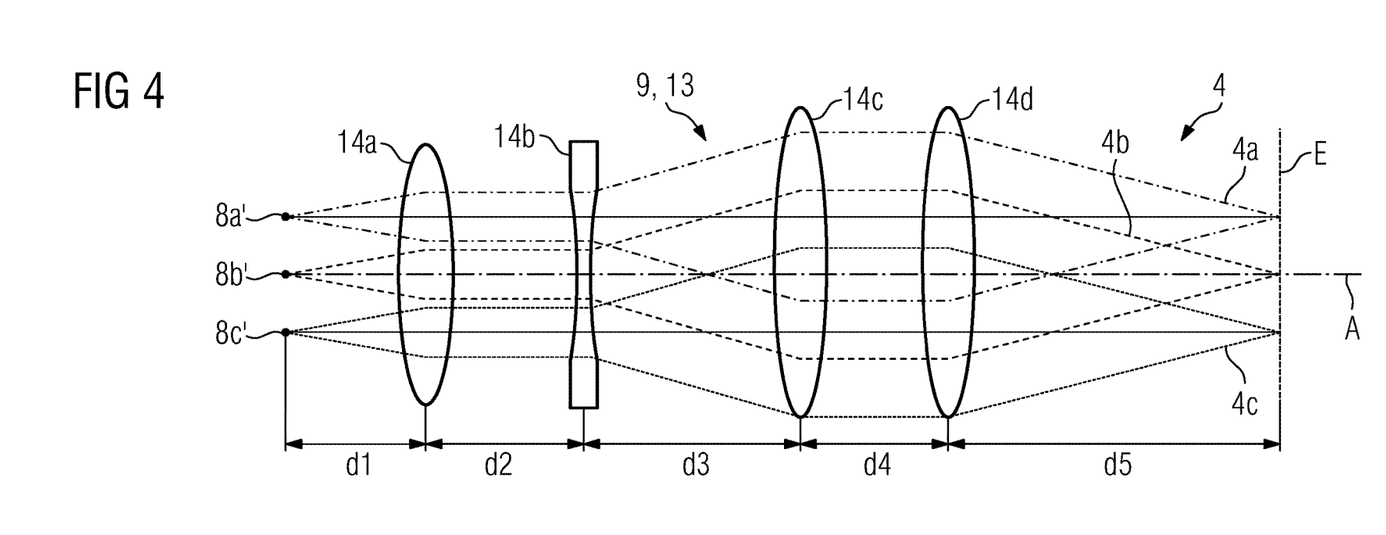

In a first exemplary configuration given in FIG. 3, 4, the optical arrangement 13 is not adapted to generate an intermediate focus. As is clear from FIG. 3, 4, the difference between the embodiments of FIG. 3 and the embodiment of FIG. 4 is the axial position of the second optical element 14b and the third optical element 14c and thus, the distance between the optical elements 14a-14d.

In the exemplary configuration according to FIG. 3, 4, the optical arrangement 13 comprises a plurality of optical elements 14a-14d coaxially arranged relative to the optical axis A of the optical arrangement A, whereby a first optical element 14a is built as a (bi)convex lens, a second optical element 14b directly disposed after the first optical element 14a with respect to the extension of the energy beams 4a-4c through the optical arrangement 13 or the optical path of the energy beams 4a-4c through the optical arrangement 13 is built as a (bi)concave lens, a third optical element 14c directly disposed after the second optical element 14b with respect to the extension of the energy beams 4a-4c through the optical arrangement 13 or the optical path of the energy beams 4a-4c through the optical arrangement 13 is built as a (bi)convex lens, and a fourth optical element 14d directly disposed after the third optical element 14c with respect to the extension of the energy beams 4a-4c through the optical arrangement 13 or the optical path of the energy beams 4a-4c through the optical arrangement 13 is built as a (bi)convex lens.

This specific arrangement of optical elements 14a-14d according to FIG. 3, 4 allows for imaging the energy beams 4a-4c in the build plane E and thus, for generating an image of the energy beams 4a-4c in the build plane E. The spot dimensions, particularly the spot diameter, of a resulting energy beam 4 irradiating the build plane E may be modified by adjusting the diameter of the raw beam in the fourth optical element 14d. The spot dimensions, particularly the spot diameter, of the resulting energy beam 4 as well as an overlap of energy beams 4a-4c may also by modified by relative motions of the irradiation head 9 and/or the build plane E outside the focal plane of the optical arrangement 13. Hence, by modifying the diameter of the raw beam in the fourth optical element 14d and the position of the build plane E relative to the focal plane of the optical arrangement 13, different spot dimensions and degrees of overlap can be achieved.

Figure 5:
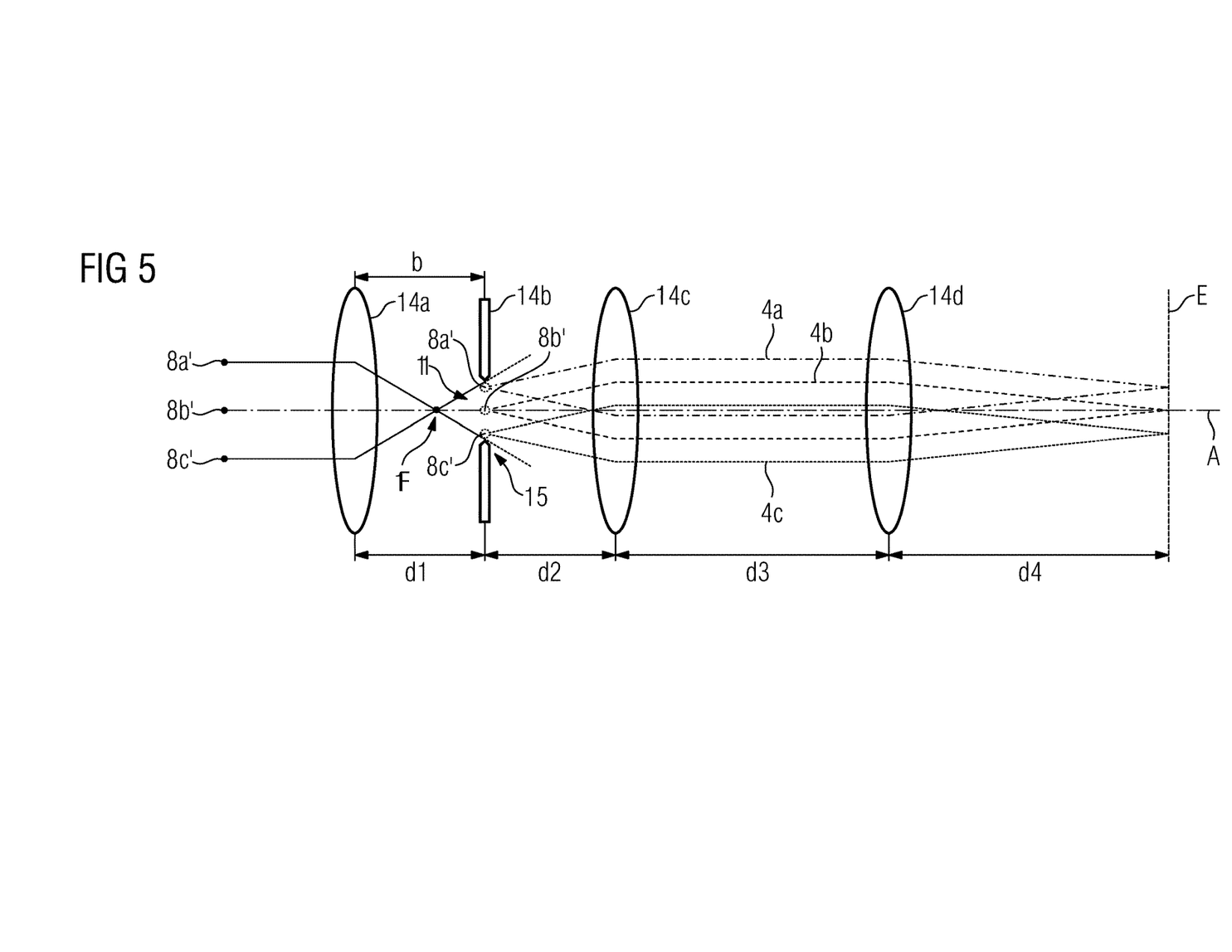
Figure 6:
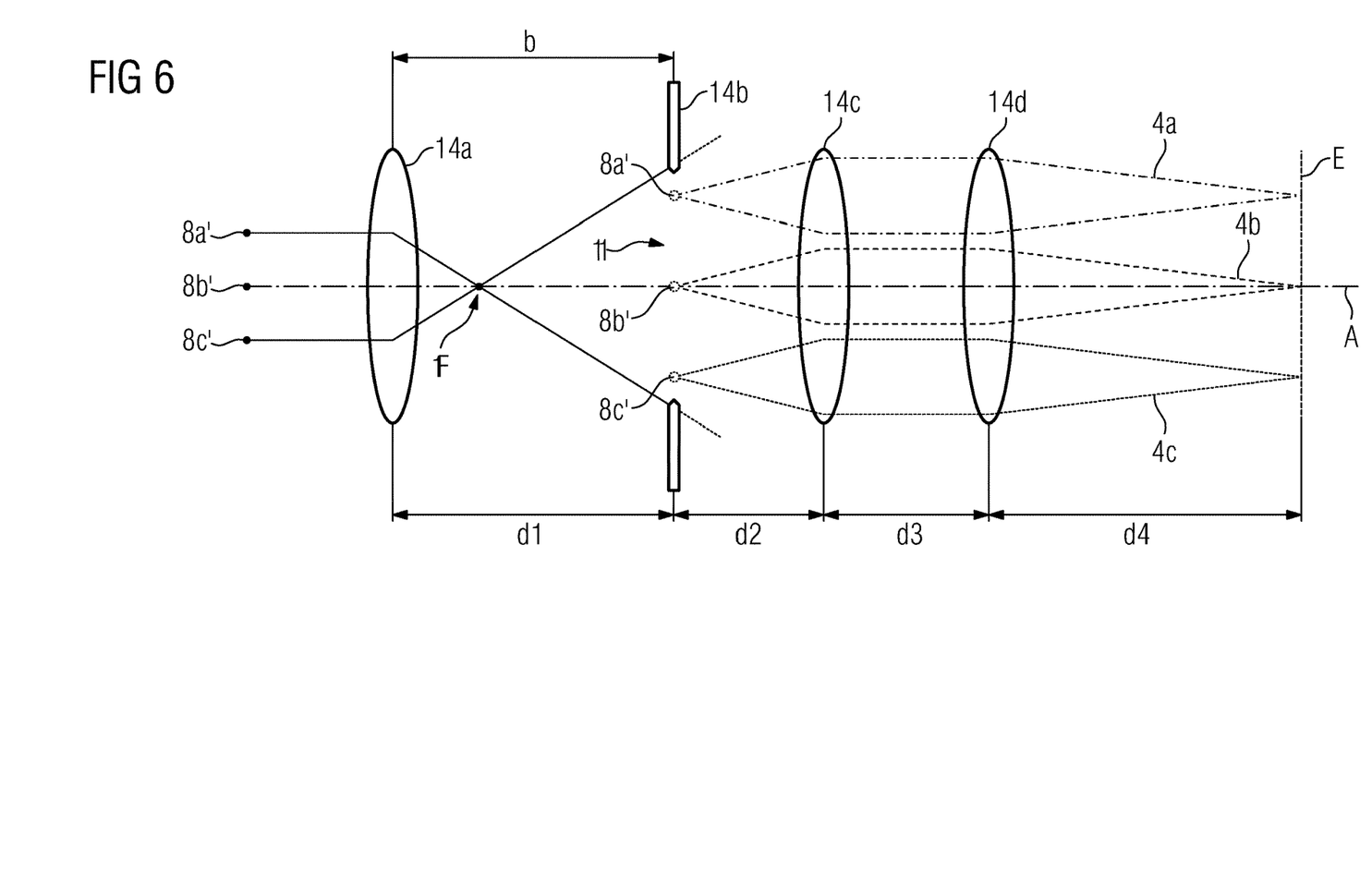

In a second exemplary configuration given in FIG. 5, 6, the optical arrangement 13 is adapted to generate an intermediate focus IF. As is clear from FIG. 5, 6, the difference between the embodiment of FIG. 5 and the embodiment of FIG. 6 is the axial position of the second optical element 14b and the third optical element 14c and thus, the distance between the optical elements 14a-14d.

In the exemplary configuration according to FIG. 5, 6, the optical arrangement 13 is adapted to generate an intermediate focus IF. Also in this configuration, the optical arrangement 13 comprises a plurality of optical elements 14a-14d coaxially arranged relative to the optical axis A of the optical arrangement 13, whereby a first optical element 14a is built as a (bi)convex lens, a second optical element 14b directly disposed after the first optical element 14a with respect to the extension of the energy beams 4a-4c through the optical arrangement 13 or the optical path of the energy beams 4a-4c through the optical arrangement 13 is built as an aperture element, e.g. a bezel element, adapted to generate a virutal intermediate image II of the energy beams 4a-4c at a specific image distance b relative to the first optical element 14a, a third optical element 14c directly disposed after the second optical element 4b with respect to the extension of the energy beams 4a-4c through the optical arrangement 13 or the optical path of the energy beams 4a-4c through the optical arrangement 13 is built as a (bi)convex lens, and a fourth optical element 14d directly disposed after the third optical element 13d with respect to the extension of the energy beams 4a-4c through the optical arrangement 13 or the optical path of the energy beams 4a-4c through the optical arrangement 13 is built as a (bi)convex lens.

This specific arrangement of optical elements 14a-14d allows for imaging the energy beams 4a-4c in a/the virtual intermediate image II. Thereby, the outputs 8a'-8c' of the beam guiding elements 8a-8c may be (virtually) changed in size, i.e. (virtually) increased or decreased in size, by modifying the image distance b and/or the size of the opening of the aperture element (second optical element 14b). The virtual intermediate image II may be used in the same manner as the image generated in the first configuration according to FIG. 3, 4; thus, the respective annotations apply in analogous manner so that by modifying the diameter of the raw beam in the fourth optical element 14d and the position of the build plane E relative to the focal plane of the optical arrangement 13, different spot dimensions and degrees of overlap can be achieved.

As is clear from FIG. 3-6, at least one optical element 14a-14d of the optical arrangement 13 may be movably supported relative to at least one further optical element 14a-14d. Moving optical elements 14a-14d relative to each other and thereby, concertedly changing distances between the optical elements 14a-14d, may increase the possibilities for modifying the beam properties of the energy beams 4a-4c coupled into the irradiation head 9 and the beam properties of a resulting energy beam 4, respectively. The moveable support of the at least one movably supported optical element 14a-14d may be implemented by means of a drive unit (not depicted), particularly a linear drive unit, adapted to generate a drive force moving the at least one movably supported optical element 14a-14d along a, particularly linear, axis of motion. The axis of motion may coincide with the optical axis A of the optical arrangement 13. A drive unit may be built as or may comprise a motor, in particular an electric motor, adapted to generate a respective drive force.

Figure 7:
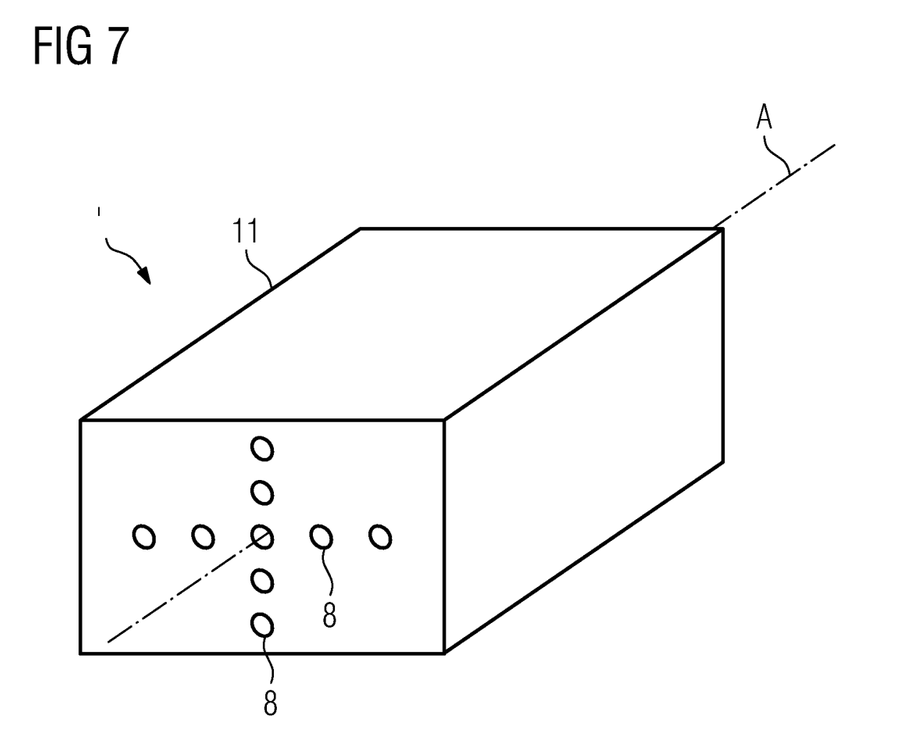
FIG. 7 shows a principle drawing of an irradiation head according to an exemplary embodiment.

FIG. 7 shows a principle drawing of an irradiation head 9 according to an exemplary embodiment.

As is discernible from FIG. 7, beam guiding elements 8 may be coupled to the irradiation head 9 in an array-arrangement (FIG. 7 shows as exemplary array arrangement) in which the beam guiding elements 8 are arranged or grouped in a special spatial relationship relative to each other. The array arrangement may comprise an arrangement of beam guiding elements 8, i.e. particularly the ends of the respective beam guiding elements 8, in at least one row and/or at least one column. Thus, a respective array arrangement may comprise at least one row in which a plurality of beam guiding elements 8, i.e. particularly the ends of the respective beam guiding elements, are arranged, and/or at least one column, in which a plurality of beam guiding elements 8, i.e. particularly the ends of the respective beam guiding elements 8, are arranged. Thus, the beam guiding elements 8, i.e. particularly the ends of the respective beam guiding elements 8, may be arranged in different radial positions relative to the optical axis A of the optical arrangement 13.

In either case, the irradiation device 6 may comprise a number of beam generating units 7a-7c having the same technical specifications so that the beam generating units 7a-7c are adapted to generate energy beams 4a-4c of (essentially) identical beam properties or the irradiation device 6 may comprise a number of beam generating units 7a-7c having different technical specifications, e.g. operational parameters, so that the beam generating units 7a-7c are adapted to generate energy beams 4a-4c of different beam properties. As such, a first beam generating unit 7a-7c may be adapted to generate at least one energy beam 4a-4c of given beam properties different from the given beam properties of at least one energy beam 4a-4c generated by at least one further beam generating unit 7a-7c. As mentioned before, this may result from different operational parameters of different beam generating units; e.g. a first beam generating unit 7a-7c may be operated at a first power level, a second beam generating unit 7a-7c may be operated at a second power level different form the first power level, for instance.

According to the exemplary embodiments given in the FIG., the number of beam generating units 7a-7c is three; yet, the number of beam generating units may be arbitrarily chosen and therefore, may be other than three.

Even if not depicted in the FIG., the apparatus 1 may comprise a, particularly modular, build unit (not depicted), the build unit comprising a build material application device adapted to apply build material in the build plane E of the apparatus 1, and the irradiation device 6, the build unit being movably supported in at least three different axes of motion/dimensions relative to the build plane E of the apparatus 1.

The invention claimed is:

1. An irradiation device for an apparatus for additively manufacturing three-dimensional objects, the irradiation device comprising:
   a plurality of beam generating units, respective ones of the plurality of beam generating units being configured to generate at least one energy beam;
   a plurality of beam guiding elements, respective ones of the plurality of beam guiding element being coupled with a corresponding one of the plurality of beam generating units; and
   an irradiation head coupled with the plurality of beam guiding elements, the irradiation head comprising at least one beam modifying unit, the beam modifying unit comprising an optical arrangement configured to modify one or more beam properties of respective ones of the plurality of energy beams;

wherein the optical arrangement comprises a plurality of optical elements arranged relative to an optical axis of the optical arrangement, wherein the optical arrangement is configured to generate an intermediate focus.

2. The irradiation device of claim 1, wherein the beam modifying unit is configured to modify one or more spot dimensions of respective ones of the plurality of energy beams.

3. The irradiation device of claim 1, wherein the optical arrangement comprises:
a first optical element comprising a biconvex lens, and
an aperture element disposed after the first optical element with respect to the extension of the plurality of energy beams through the optical arrangement;
wherein the aperture element is configured to generate an intermediate image of the plurality of energy beams at a specific image distance relative to the first optical element.

4. The irradiation device of claim 1, wherein plurality of optical elements respectively comprise a biconvex lens or a biconcave lens.

5. The irradiation device of claim 1, wherein the optical arrangement comprises:
a first optical element comprising a biconvex lens;
a second optical element comprising a biconcave lens, the second optical element disposed after the first optical element with respect to the extension of the plurality of energy beam through the optical arrangement;
a third optical element comprising a biconvex lens, the third optical element disposed after the second optical element with respect to the extension of the plurality of energy beams through the optical arrangement;
a fourth optical element comprising a biconvex lens, the fourth optical element disposed after the third optical element with respect to the extension of the plurality of energy beams through the optical arrangement.

6. The irradiation device of claim 1, wherein the optical arrangement comprises a plurality of optical elements arranged relative to the optical axis of the optical arrangement, wherein the plurality of optical elements comprises:
a first optical element comprising a biconvex lens;
a second optical element comprising an aperture element configured to generate an intermediate image of the plurality of energy beams at a specific image distance relative to the first optical element, the second optical element disposed after the first optical element with respect to the extension of the plurality of energy beams through the optical arrangement;
a third optical element comprising a biconvex lens, the third optical element disposed after the second optical element with respect to the extension of the plurality of energy beams through the optical arrangement; and
a fourth optical element comprising biconvex lens, the fourth optical element disposed after the third optical element with respect to the extension of the plurality of energy beams through the optical arrangement.

7. The irradiation device of claim 1, wherein the optical arrangement comprises a plurality of optical elements arranged relative to the optical axis of the optical arrangement, wherein at least a first one of the plurality of optical elements is moveably supported relative to at least a second one of the plurality of optical elements.

8. The irradiation device of claim 1, wherein the beam guiding elements are coupled to the irradiation head in an array comprising at least one row, at least one column, and/or a plurality of radial positions.

9. The irradiation device of claim 1, wherein the plurality of beam generating units comprises:
a first beam generating unit configured to generate at least a first energy beam; and
a second beam generating unit configured to generate at least a second energy beam;
wherein the first energy beam and the second energy beam differ from one another in respect of at least one beam property.

10. The irradiation device of claim 1, wherein the plurality of beam generating units comprises a laser diode unit.

11. An apparatus for additively manufacturing three-dimensional objects, the apparatus comprising:
an irradiation device comprising:
a plurality of beam generating units, respective ones of the plurality of beam generating units being configured to generate at least one energy beam;
a plurality of beam guiding elements, respective ones of the plurality of beam guiding element being coupled with a corresponding one of the plurality of beam generating units; and
an irradiation head coupled with the plurality of beam guiding elements, the irradiation head comprising at least one beam modifying unit, the beam modifying unit comprising an optical arrangement configured to modify one or more beam properties of respective ones of the plurality of energy beams;
wherein the optical arrangement comprises a plurality of optical elements arranged relative to an optical axis of the optical arrangement, wherein the optical arrangement is configured to generate an intermediate focus.

12. The apparatus of claim 11, wherein the beam modifying unit is configured to modify one or more spot dimensions of respective ones of the plurality of energy beams.

13. The apparatus of claim 11, wherein the optical arrangement comprises:
a first optical element comprising a biconvex lens, and
an aperture element disposed after the first optical element with respect to the extension of the plurality of energy beams through the optical arrangement;
wherein the aperture element is configured to generate an intermediate image of the plurality of energy beams at a specific image distance relative to the first optical element.

14. The apparatus of claim 11, wherein plurality of optical elements respectively comprise a biconvex lens or a biconcave lens.

15. The apparatus of claim 11, wherein the optical arrangement comprises:
a first optical element comprising a biconvex lens;
a second optical element comprising a biconcave lens, the second optical element disposed after the first optical element with respect to the extension of the plurality of energy beam through the optical arrangement;
a third optical element comprising a biconvex lens, the third optical element disposed after the second optical element with respect to the extension of the plurality of energy beams through the optical arrangement;
a fourth optical element comprising a biconvex lens, the fourth optical element disposed after the third optical element with respect to the extension of the plurality of energy beams through the optical arrangement.

16. The apparatus of claim 11, wherein the optical arrangement comprises a plurality of optical elements arranged relative to the optical axis of the optical arrangement, wherein the plurality of optical elements comprises:
a first optical element comprising a biconvex lens;

a second optical element comprising an aperture element configured to generate an intermediate image of the plurality of energy beams at a specific image distance relative to the first optical element, the second optical element disposed after the first optical element with respect to the extension of the plurality of energy beams through the optical arrangement;

a third optical element comprising a biconvex lens, the third optical element disposed after the second optical element with respect to the extension of the plurality of energy beams through the optical arrangement; and a fourth optical element comprising biconvex lens, the fourth optical element disposed after the third optical element with respect to the extension of the plurality of energy beams through the optical arrangement.

17. The apparatus of claim 11, wherein the optical arrangement comprises a plurality of optical elements arranged relative to the optical axis of the optical arrangement, wherein at least a first one of the plurality of optical elements is moveably supported relative to at least a second one of the plurality of optical elements.

18. The apparatus of claim 11, wherein the beam guiding elements are coupled to the irradiation head in an array comprising at least one row, at least one column, and/or a plurality of radial positions.

19. The apparatus of claim 11, wherein the plurality of beam generating units comprises:

a first beam generating unit configured to generate at least a first energy beam; and a second beam generating unit configured to generate at least a second energy beam;

wherein the first energy beam and the second energy beam differ from one another in respect of at least one beam property.

20. The apparatus of claim 11, wherein the plurality of beam generating units comprises a laser diode unit.

* * * * *